Nov. 21, 1967  H. M. DODGE  3,354,243
METHOD OF CURING RUBBER EXTRUSIONS
Filed July 13, 1966  3 Sheets-Sheet 1

INVENTOR
Howard M. Dodge
BY
McCoy, Greene + de Grootenluis
ATTORNEYS

Nov. 21, 1967  H. M. DODGE  3,354,243
METHOD OF CURING RUBBER EXTRUSIONS
Filed July 13, 1966  3 Sheets-Sheet 3

INVENTOR
Howard M. Dodge

BY McCoy, Greene + LeBlanc
ATTORNEYS

United States Patent Office 3,354,243
Patented Nov. 21, 1967

3,354,243
METHOD OF CURING RUBBER EXTRUSIONS
Howard M. Dodge, Hudson, Ohio, assignor to National Friction Products Corp., Cass County, Ind., a corporation of Indiana
Filed July 13, 1966, Ser. No. 564,814
8 Claims. (Cl. 264—25)

The present invention relates to rapid curing of thermosetting materials and more particularly to a simple inexpensive method of and apparatus for continuously extruding and curing rubbery materials to form cellular and non-cellular products of a predetermined cross section.

Heretofore, rubber gaskets, sealing strips and other extruded rubber products have been made by extruding the uncured rubber at a temperature below the vulcanizable temperature, cutting lengths of the extruded unvulcanized material, and thereafter vulcanizing the rubber. In order to prevent a substantial change in the shape of the extrusion during the vulcanization, the rubber material was made relatively stiff by incorporating large amounts of fillers or pigments. The known processes were not, therefore, well suited for making very soft rubber articles or sponge rubber articles in which it was desirable to limit the amount of filler. Also, such processes were unsuitable for rubber or plastic materials which flowed readily and would not retain their extruded shape while uncured or being cured.

Prior to this invention, those skilled in the art knew of no practical continuous process for masticating, extruding and curing at elevated temperature a thermosetting material, such as rubber. It was not known that the material could be heated to curing temperature and simultaneously moved through a shaped heated passage to maintain the extruded shape during curing, and such a continuous process also was not considered feasible because of the friction preventing movement through such passage, particularly because of the length of passage believed necessary for proper heating and curing and because of danger of set up or pre-cured highly accelerated materials in the extruder prior to final shaping. Applicant conceived methods of reducing such friction, but could not solve the problem in this manner using known vulcanization methods because of the long time required to bring the rubber being extruded from a safe non-curing temperature in the extruder up to the temperature where the vulcanization process with the great rapidity required for continuous operation. Applicant realized that the use of expensive dielectric heating equipment could reduce the vulcanization time, but this was no solution to the problem because such equipment requires high voltages and much insulation and can not be properly located at the discharge end of the extruder.

The present invention involves the discovery of a revolutionary new method of heating rubber compositions using high frequency, low voltage, induction heating equipment which has no effect on an ordinary extrudable rubber composition, but which effects uniform rapid heating of such composition when it contains a minor amount of the non-conducting magnetic iron oxide, magnetite ($Fe_3O_4$). Surprisingly, the high frequency induction heating equipment of the type used to heat conductive metals and conductive ferromagnetic alloys by inducing a rapidly changing current therein is effective to heat a non-conductive finely divided material, such as magnetite, which happens to be desirable pigment well suited for incorporation into many rubber compositions including those desired for friction and for abrasion resistance. The process of this invention makes it possible to effect very rapid heating of a thermosetting material, such as compounds of rubber or of thermosetting resin, in the uniform manner desired for a high quality product. The quality of the product is not degraded as in the case when the rubber was loaded with iron filings or other conductive metal particles, for example. This process of this invention has tremendous advantages in the rubber industry.

High frequency induction employs low voltages, so that heating apparatus based on electromagnetic induction is simple and safe to operate and may be located adjacent the metal parts of an extruding die apparatus for continuously extruding and curing rubber compositions while maintaining the exact cross-sectional shape.

The novel apparatus of this invention for preparation of cured extruded articles comprises the combination of an extruder, a shaping element such as an extrusion die, an electrically non-conductive curing tube having generally the same internal cross-sectional shape as the die for receiving the extruded rubber, heating apparatus including a high frequency, relatively high current, low voltage magnetic induction heater having means such as an induction coil (preferably hollow and liquid cooled) surrounding said tube for applying a rapidly changing magnetic field to the shaped material and usually an additional heater or vulcanizer to maintain curing temperature and complete the curing, and means for reducing the friction between the extruded rubber and the internal surface of said tube as said rubber moves through the tube.

Friction in the heating and curing zones may be reduced by employing a permeable tube or the like, such as a porous porcelain tube, and forcing a lubricant through the pores or openings of said tube to the outer surface of the extruded rubber in the tube. An alternative way of reducing the friction is to employ a porous non-conductive solid curing or heating chamber such as an unglazed porcelain or fritted glass tube or the like having the pores of its internal surface filled with lubricious particles of microscopic size, such as a perfluorinated solid hydrocarbon of which polytetrafluoroethylene Teflon powder is an example. The surface pores are filled by heating the porous article above 150° F. and preferably above the temperature where it is to be used to expand the pores therein and then brushing or working Teflon powder, preferably while extremely cold, into the surface pores.

The apparatus may be constructed to make extruded sponge rubber sealing strips, especially those with closed cells suitable for vehicle closure seals and the like. In such a case, the rubber composition contains a blowing agent which releases gas at a temperature above the temperature in the extruder and preferably no greater than the vulcanization temperature used. If desired, inasmuch as the product may be heated substantially uniformly throughout, the extruded product can be blown or expanded soon after vulcanization is initiated by providing the rubber receiving passage with a predetermined taper at the induction heating zone and/or a subsequent heating zone. By limiting the degree of expansion during curing, a closed cell sponge may be obtained.

The process of this invention may be applied to the manufacture of an infinite number of different extruded or molded articles. For example, the thermosetting material may be continuously extruded and cured around a central reinforcing cord or cable.

While the invention has exceptional value in production of extruded articles, it may also be used for production of molded parts. Thus, the invention also facilitates manufacture of various friction materials, particularly high friction products such as clutch and brake elements or the like. Heretofore, many friction materials and high quality rubber products had to be cured or vulcanized for relatively long periods of time to obtain uniform curing because of the time required for conduction of heat to the interior portions and the need for avoiding over curing at the outer surface. Where it previously required almost an hour to cure or vulcanize certain brake shoes because of the poor conductivity of heat, for example, the present invention makes it possible to produce substantially the same product in a few minutes without sacrifice of quality.

An object of the invention is to provide a superior process for producing vulcanized or cured sponge extrusions of thermosetting compositions compounded for relatively fast curing.

A further object of the invention is to provide a simple process for making extruded cellular elastomeric articles, such as sponge rubber sealing strips.

A still further object of the invention is to provide a reliable continuous process for extruding and vulcanizing thermosetting materials, such as rubber, which provides a high degree of accuracy.

These and other objects, uses and advantages of the invention will become apparent to those skilled in the art from the following description and claims and from the drawings, in which:

Figures 1, 2, 3:
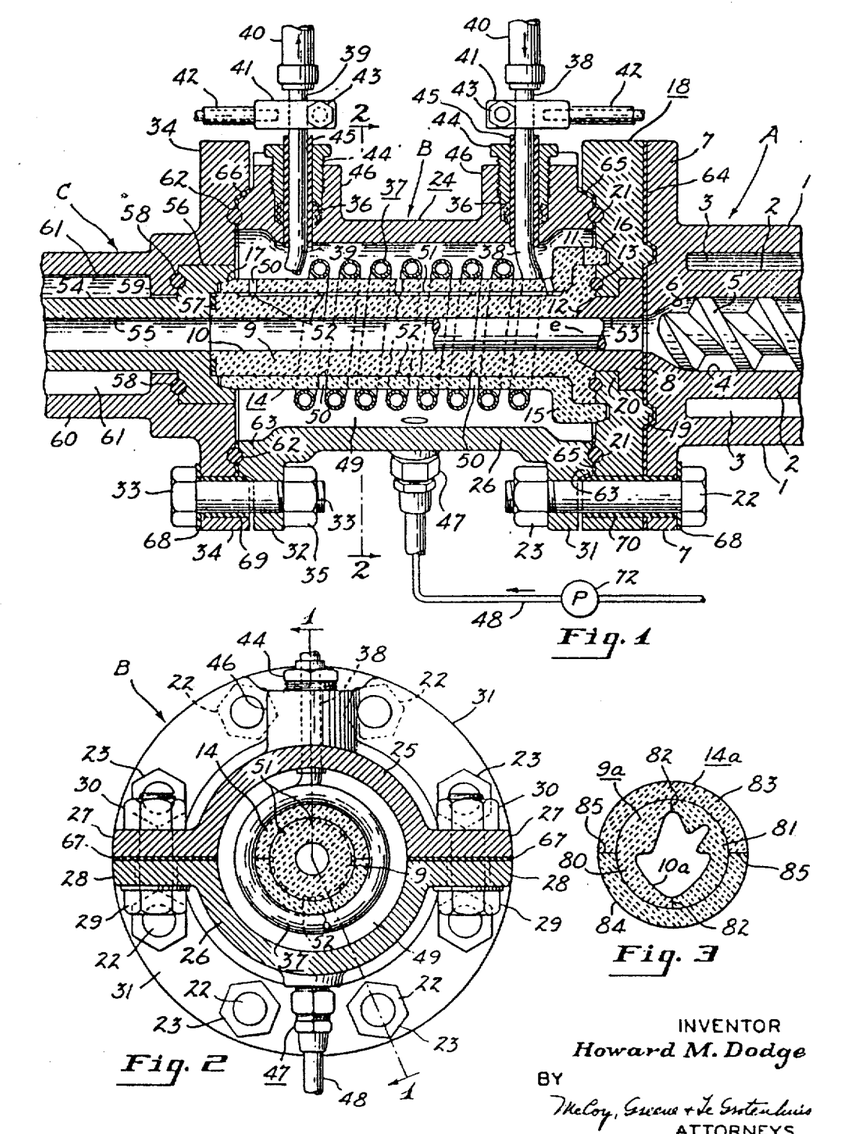
FIGURE 1 is a fragmentary vertical sectional view showing an extruding and vulcanizing apparatus constructed according to the present invention, a portion of the apparatus being shown diagrammatically.
FIGURE 2 is a transverse vertical sectional view taken on the line 2—2 of FIGURE 1.
FIGURE 3 is a transverse sectional view showing on a different scale a modified form of ceramic die which may be used in the induction heating apparatus of FIGURES 1 and 2.

Referring more particularly to the drawings, in which like parts are identified by the same numerals throughout the several views, in some cases with suffix letters added, FIGURES 1 and 2 show apparatus constructed according to this invention comprising a conventional extruder A for shaping an extrusion $e$ of a suitable thermosetting material, an induction heating apparatus B for rapidly heating the moving extrusion to curing temperature while maintaining its extruded shape, and a steam curing apparatus C for maintaining the extrusion at a temperature suitable for curing as it moves axially until it has been cured to the desired amount.

The process of this invention is particularly well suited for the mass production of extrusions formed of thermosetting material. The induction coil of the heating apparatus can be placed very close to the forming die and other metal parts at the discharge end of the extruder because high voltages are not needed. Also, because the high-frequency magnetic field heats the particles of magnetic iron oxide in the thermosetting material very rapidly to minimize the time required to cure a given length of the extrusion, a relatively short non-magnetic die may be provided within the induction coil to maintain the shape of the extrusion during initial heating from extrusion to curing temperature without too much frictional drag due to its length.

The use of the novel thermosetting compositions of this invention, which contain enough magnetic iron oxide to permit rapid induction heating, makes it possible to mass produce various thermosetting rubber and plastic extrusions continuously in a manner unlike anything previously known in the art. The invention makes it possible, for the first time, to cure an extrusion of special cross-sectional shape while it is fed axially out of the extruder and simultaneously to shape it or provide it with the desired cross section during curing.

As herein shown, the process of this invention is performed by the assemblies A, B and C, but it will be apparent that the type of equipment used to perform the process may vary considerably. The assembly A may, of course, be replaced by other conventional types of extruder and the assembly B may be replaced by other suitable curing and shaping chambers. The assembly C may be replaced by other suitable shaped heating and curing apparatus.

The extruder A, as shown herein, has outer and inner cylindrical walls 1 and 2 and an annular chamber 3 for receiving circulating water or other fluid maintained at the proper temperature for extrusion of the thermosetting material. The extruder is of a conventional type and has a central cylindrical bore 4 containing a motor-driven screw 5 terminating at the tapered end portion 6 of the bore. The portion 6 is located at the center of the flanged end 7 of the extruder and is frustro-conical and coaxial with the bore 4 and the internal cylindrical surface 53 of the forming die 8, which is rigidly mounted in the die plate 18. The cross-sectional shape of the surfaces 6 and 53 will vary, of course, depending on the type of extrusion desired, the extrusion $e$ being shown herein as cylindrical merely for convenience. Hollow extrusions and more complicated shapes such as shown in FIGURE 3 are often necessary for specific uses, and it will be understood that almost all of the known types of extrusions may be produced using the novel thermosetting compositions of this invention.

The induction heating apparatus B shown herein contains an axially elongated non-metallic die 9 with an accurately machined internally cylindrical surface 10 of preferably about the same cross section as the surface 53 and coaxial with that surface. Said die usually has a length many times its diameter. The die is usually formed of a durable refractory or ceramic material and may be formed in two halves (see FIGURE 3) to facilitate accurate formation of the surface 10 (as by electronic machining). As shown in FIGURES 1 and 2, the die 9 is formed in two generally semi-cylindrical pieces and has an annular radial flange 11 that fits against the tapered surface of the end portion 12 of the forming die 8 and against the elastomeric O-ring seal 13 to prevent extrusion between the parts 8 and 9.

It is often desirable to reinforce the die 9, particularly when it is relatively thin or is made of a hard ceramic material having inadequate tensile strength as herein shown, the externally cylindrical die 9 fits inside an internally cylindrical die clamp 14 of circular cross section having an enlarged annular end portion 15 which fits the flange 11 of the die. As shown, the member 14 is split into two pieces, but this is not essential. The tapered annular portion 16 at one end of the member 14 fits the similarly shaped groove of the plate 18 to hold the two halves together, the similar portion 17 at the opposite end serving the same purpose.

The die plate 18 has an annular sealing rib 19 of a trapezoidal cross section fitting in a tapered annular groove of the extruder A concentric to the die 8 and has a radially inner annular portion 20 which holds the die in place. The portion 20 is grooved to receive an outer elastomeric O-ring 21, which sealingly engages the projecting tapered portion 63 of the apparatus B. The latter apparatus is rigidly connected to the plate 18 and the flange 7 of the extruder by a series of circumferentially spaced bolts 22 received by circular holes of the extruder flange 7 and the heater flange 31 and having nuts 23 which are tightened against the latter flange.

As herein shown, the apparatus B comprises a two-piece housing 24 having the radial flanges 31 and 32 at its opposite ends. The upper half 25 of the housing has horizontal flanges 27 at opposite sides thereof, and the lower half 26 has similar flanges 28 rigidly connected to flanges 27 by bolts 29 and nuts 30. The flanges 31 of the apparatus B are rigidly connected to the apparatus A by the circumferentially spaced bolts 22, and the similar flanges 32 are rigidly connected to the radial flange 34 of the apparatus C by similarly spaced bolts 33 having nuts 35.

The extruded thermosetting material passing through the ceramic die 9 contains particles of magnetic iron oxide and is heated rapidly to the curing or vulcanization temperature by being subjected to a high frequency alternating magnetic field such, for example, as the type employed to heat crankshaft bearing surfaces. Equipment of this type is well-known for use in heating electrically conductive metal. It will be apparent, however, that the construction of the induction heating apparatus B may vary considerably. The heating effect is dependent on both the strength and frequency of the magnetic field used, being greater with both increasing frequency and increasing field strength. The field strength obviously depends on current and number of turns of the coil producing the field. The field strength and frequency required to effect heating of the thermosetting composition will vary according to the types and amounts of curing agents employed and the amount of the magnetic iron oxide employed in such composition. When the frequency is greater than 100,000 cycles per second, the current carrying coils may have a lesser number of turns and become of more convenient size. The apparatus should usually provide a frequency of at least 200,000 cycles per second and high enough field strength to heat the thermosetting composition from 200° to 400° F. in less than six seconds, preferably no more than four seconds. A frequency between 300,000 and 1,000,000 cycles per second or higher may be used.

As herein shown, the apparatus B includes a helical induction coil 37 formed of a tubular copper conductor or the like and having individual circular convolutions with an inside diameter almost equal to the outside diameter of the die clamp 14. It is preferable to provide a hollow tube so that the coil may be cooled with water or other liquid, but other cooling arrangements may also be employed. As herein shown, the coil 37 has inlet and outlet legs 38 and 39 connected to flexible hoses 40 which continuously circulate water through the coil. The water temperature and rate of circulation may vary considerably, but are such as to avoid excessive cooling of the outer surface of the extrusion e. Generally, the temperature of the die 9 should be no less than the temperature of the thermosetting material leaving the die 8.

The legs 38 and 39 of the copper tubes are connected by copper clamps 41 to electric supply conduits 42, whereby the necessary high frequency alternating current is supplied to the coil 37 during extrusion and curing from a suitable conventional high-current low-voltage source (not shown). The clamps 41 are detachable like a conventional automobile battery clamp and are tightened by the nuts 43 in suitable positions above the threaded fittings 44 and the electrical insulating sleeves 45 therein. Said fittings are screwed into the bosses 46 of the housing 24 against the sealing material 36 therein to effect an air-tight seal. An inlet fitting 47 connected to a supply conduit 48 is screwed into the bottom of the housing 24, whereby die lubricating fluid under pressure may be supplied to the sealed annular chamber 49 surrounding the induction coil 37.

In order to reduce the friction as the extrusion e moves through the die passages 53, 10 and 55, it is desirable to provide a lubricious material at the exterior surface of the cured extrusion during cure. This becomes almost essential where these passages carry the extrusion a considerable distance such as 10 feet or more. One way of obtaining the needed lubrication is, as aforementioned, to embed microscopic particles of a lubricious material, such as powdered polytetrafluoroethylene (Teflon), or other perfluorinated hydrocarbon, in the pores of the internal die surfaces as described in more detail hereinafter. In the embodiment shown in FIGURES 1 and 2, a liquid mold lubricant such as a silicone oil or liquid end blocked polydimethylsiloxane is metered under pressure into the chamber 49 from the conduit 48 at a definite rate. The lubricant liquid is under a pressure greater than that applied by the extruder A so that a measured or definite quantity of such fluid moves radially inwardly through the pores of the die 9 to the external surface of the extrusion e. The die 9 is preferably porous along its full length so that the lubricant fluid can penetrate the die along its full length. The two-piece clamp 14 is shown herein as being perforated to permit such lubricant flow. It has a series of radial openings 50 radially aligned with annular grooves 52 of the die 9, and said die has at least one longitudinal groove 51 connecting said annular grooves. The arrangement of the lubricant passages may, of course, vary considerably.

The lubricant applied to the exterior of the extrusion e as it passes through the heating apparatus B also helps to reduce friction in the curing die 54 of the curing apparatus C, and it is usually unnecessary to supply additional lubricant in the latter die. As herein shown, the apparatus C has a generally cylindrical curing die 54 with a smooth accurately formed inner shaping surface 55 of the same shape as the surfaces 10 and 53 and axially aligned with those surfaces. Said die has a radial flange 56 adjacent the large radial flange 34 which fits the tapered end portion 17 of the die clamp 14 and engages the sealing washer 57 at the end of the die 9. As shown, an O-ring seal 58 is provided between the annular flange 56 and the annular inner flange 59 of the apparatus C, and a similar O-ring seal 62 is provided between the flange 34 and the projecting portion 63 to seal the housing 24.

The curing die 54 and the concentric cylindrical wall 60 provide a closed jacket for an annular fluid, e.g., steam, chamber 61 which may, if desired, extend the full length of the curing die 54. Steam or other suitable heating fluid is circulated in the chamber 61 to maintain the extrusion in the die 54 at the desired curing temperature. Thus, the apparatus B rapidly brings the extrusion up to desired curing temperature and the apparatus C maintains he desired temperature until adequate curing is obtained during continuous passage therethrough. Of course, the curing will continue even after the extrusion passes away from the fluid chamber 61 until the residual heat is dissipated or removed by cooling the extrusion.

Alternating current through coil 37 tends to induce current flow in the adjacent electrically conductive metal arts. For this reason, the die 9 should be made of a non-magnetic non-conducting material, such as a porous porcelain or other suitable ceramic material, and the die clamp 4 should also be made of a non-magnetic electrically non-conductive material. All of the parts near the coil 7 may be non-metallic non-conducting materials, but it is usually preferred to provide metals which have greater strength.

In order to reduce or prevent transformer effect or induced flow of the electric current through the metal parts, is desirable to insulate the parts from each other. As herein shown, a continuous electrical insulation sheet 64 is provided between the extruder flange 7 and the plate 8, and continuous insulation layers 65 and 66 are provided adjacent the O-rings 21 and 62, respectively, which over the portions 63 to insulate the housing 24 electrically from the plate 18 and the flange 34. The two halves 5 and 26 of said housing are also shown as being insulated from each other by the electric insulating sheets 7 located between the flanges 27 and 28. The various bolts 22, 29 and 33 may also be electrically insulated from their associated flanges. As herein shown, insulating washers 68 and insulating sleeves 69 and 70 are used with the bolts for this purpose.

Means provided for supplying the lubricant fluid under pressure to the supply line 48 should have positive volume control regardless of pressure required. A positive acting gear pump such as is used for forcing viscose or liquid through spinnerette orifices is preferred. Such a pump 72, driven by a suitable variable speed electric motor (not shown) forces the lubricant from a reservoir (not shown) to the conduit 48.

The cross section of the extruded article made by the process of this invention may take an infinite number of forms. Where the extrusion is rectangular, the extruder A and die 8 may be replaced by a calender. When making rubber sealing strips or gaskets, a complicated cross section may be desirable. It may, for example, be desirable to provide an extrusion with a shape as illustrated in FIGURE 3. That figure shows a ceramic die 9a and a clamp 4a which are similar to the parts 9 and 14 of apparatus and may be used to replace them. The externally cylindrical die 9a is made in two parts 80 and 81 with abutting faces 82 on its opposite sides and the clamp 14a is made in two semi-cylindrical parts 83 and 84 with abutting faces 85. Otherwise, the die 9a and the clamp 14a may be the same as the parts 9 and 14. Of course, the extruder will employ a forming die having the same cross-sectional shape as the die of the induction heating apparatus.

The die 9a is preferably made in two halves to facilitate accurate forming of the internal surface 10a, but this is not essential. Splitting of the die is also advantageous in that it makes it possible to embed microscopic particles of Teflon or other lubricious material in the pores of the surface 10a.

The process of this invention is also well-suited for the continuous extrusion and curing of cellular products such as foam strips and the like, particularly closed-cell sponge rubber products. It is known, for example, as disclosed in my Canadian Patent No. 549,331, that closed-cell rubber sheets may be produced from conventional rubber compositions containing nitrogen-evolving blowing agents or the like by passing them between fixed diverging walls. The present invention makes it possible to obtain similar cellular structures when making extrusions. Suitable structures for producing closed-cell sponge rubber extrusions are shown in FIGURES 4 and 5.

Figure 4:
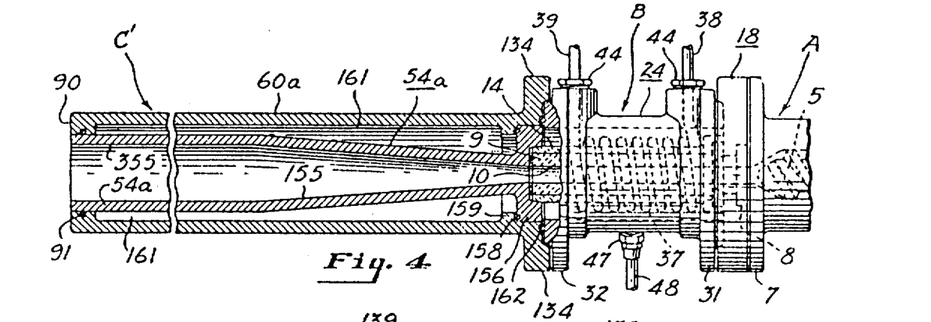
FIGURE 4 is a foreshortened fragmentary side elevational view on a reduced scale with parts omitted and parts shown in longitudinal cross section illustrating a modified form of extruding and vulcanizing apparatus for making foam rubber products.

In the embodiment of FIGURE 4, the fluid or stream curing apparatus C of FIGURES 1 and 2 is replaced by a similar apparatus C which is rigidly connected to the housing 24 of the apparatus B by bolts (not shown) in the same way. The apparatus C has a curing die 54a coaxial with the ceramic die 9 and provided with a smooth inner surface 155 which gradually increases in width from the entrance end to the internal surface 355, whose width is constant. The cross-sectional shape of the surfaces 155 and 355 may be the same as that of the surfaces 10 and 53, except for the expansion, and the inlet end of surface 155 may be of the same cross-sectional size as the surface 10. The rate of expansion provided by the surface 155 is selected in accordance with the rate of curing of the rubber or other thermosetting material and such expansion does not occur until the rubber is cured sufficiently to prevent rupturing of the cells by the nitrogen gas from the blowing agent. Thus, the rubber extrusion may be partially vulcanized in the induction heater B for a period of time sufficient to release the nitrogen gas from the blowing agent and to prevent rupturing of the cells when the rubber is allowed to expand. Of course, the taper of the surface 155 may also be selected to prevent such rupture.

The apparatus C has a cylindrical outer wall 60a extending from the radial flange 134 to the end flange 90 to provide an annular steam chamber 161 which is sealed by the O-ring 91. The radial flange 156 of the curing die 54a receives the die 9 and the clamp 14 like the flange 159 of the steam jacket. The flange 134 is rigidly connected to the flange 32 of the apparatus B like the flange 34 and has an O-ring seal 162 similar to seal 62.

Figure 5:
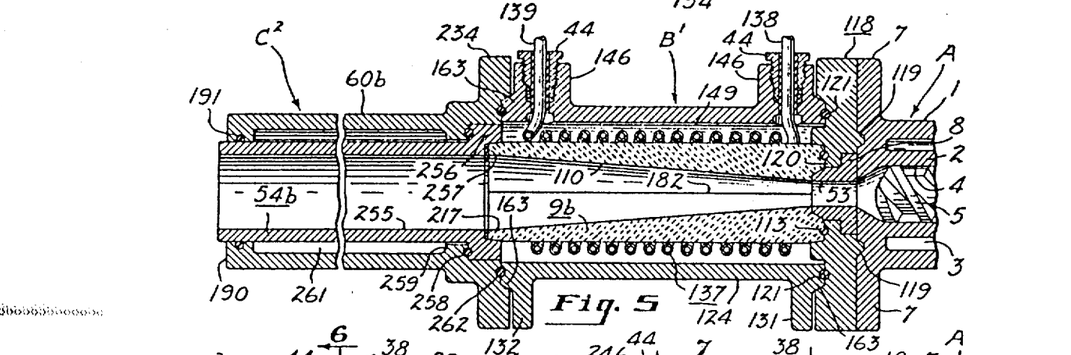
FIGURE 5 is a foreshortened fragmentary vertical sectional view with parts omitted showing another modified form of extruding and vulcanizing apparatus.

In the embodiment of FIGURE 5, the expansion needed to form the desired open- or closed-cell structure takes place within the induction coil, and the friction is reduced by embedding microscopic particles of Teflon in the pores of the internal die surface. The extrusion apparatus A and the forming die 8 are the same as before, but the induction heating apparatus is replaced by an apparatus B having a split externally cylindrical ceramic die 9b with a smooth internal shaping surface 110 coaxial with the die surface 53. At the inlet end, the cross section of the surface 110 is the same as that of the surface, and such cross section gradually increases in diameter to the downstream end, the amount of taper being selected to provide either open or closed cells in the cellular extrusion depending on the rate of feed, the temperature at which the blowing agent releases the gas, the rate of curing and the rate of the induction heating.

The two-piece die 9b is shown herein as having an external cylindrical surface and a concentric internal conical surface when the two halves thereof are mounted with their abutting side faces 182 in engagement as shown in FIGURE 5. The end portion of the die is shaped to fit the tapered end of the forming die 8 and to engage an O-ring seal 113 carried by the plate 118. The latter plate is similar to plate 18 and has a tapered annular rib 119 which fits the corresponding groove of the apparatus A. The radially inner flange 120 holds the die 8 in place and the O-ring 121 provides a seal between the plate 118 and the projecting portion 163 of the housing 124. Said housing is similar to housing 24 and has radial flanges 131 and 132 rigidly connected to the flanges of the extruder and the steam curing jacket by bolts (not shown) like the flanges 31 and 32.

The apparatus B has an induction coil 137 formed of a copper tube which provides circular convolutions at the outer surface of the die 9b between the inlet and outlet legs 138 and 139. The housing 124 has bosses 146 for receiving the fittings 44, but a tight seal is not necessary because the annular chamber 149 of the housing is empty. The lubricant supply fitting 47 and the supply of lubricant are omitted in this embodiment.

The apparatus $C^2$ of FIGURE 5 includes a metal curing die 54b having a smooth internal shaping surface 255 of the same cross section as the discharge end of surface 110. The die is surrounded by a cylindrical jacket wall 60b defining an annular fluid or steam chamber 261 which is closed at one end by the flange 190 and O-ring seal 191 and at the opposite end by the inner flange 259 and the O-ring seal 258. The radial flange 234 is rigidly connected to the flange 132 of apparatus B by a series of circumferentially spaced bolts (not shown) similar to the bolts 33 which hold the tapered projecting portion 163 in sealing engagement with the O-ring 262 and hold the radial flange 256 of the curing die in a fixed position against the O-ring 258, the sealing washer 257, and the tapered end portions 217 of the die 9b.

Figure 6:
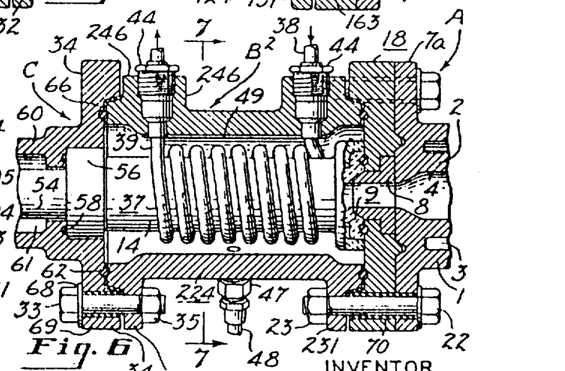
FIGURE 6 is a fragmentary vertical sectional view taken on the line 6—6 of FIGURE 7 showing a modified form of induction heating apparatus which may be used in the combination of FIGURES 1 and 2.
Figure 7:
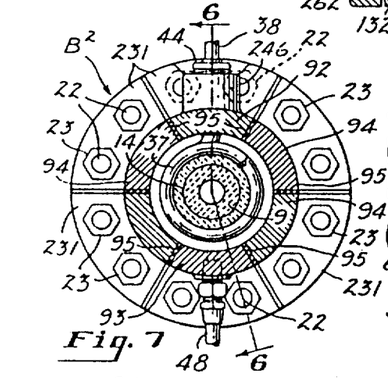
FIGURE 7 is a transverse vertical sectional view taken on the line 7—7 of FIGURE 6.

The housing of the induction heating apparatus may, if desired, be divided into more than two parts to reduce the induction of current flow in the metal parts. As shown in FIGURES 6 and 7, the equipment is the same as that of FIGURES 1 and 2 except that the apparatus B is replaced by a similar apparatus B² having its housing 224 formed in segments 92 to 94, each having short radial flanges 231 and 232 at its opposite ends rigidly connected to the plate 18 and the flange 34 by the circumferentially spaced bolts 22 and 33 and their associated nuts 23 and 35. Each segment is electrically insulated from the two adjacent segments by strips 95 formed of suitable insulating material which also provide a seal to prevent loss of pressure in the annular chamber 49. The upper segment 92 is provided with bosses 246 for the fittings 44 and the lower segment 93 has an internally threaded opening to receive the fitting 47. The remaining four segments 94 are arranged as shown in FIGURE 7 to complete the housing 224 which is essentially the same size as housing 24.

Figure 9:
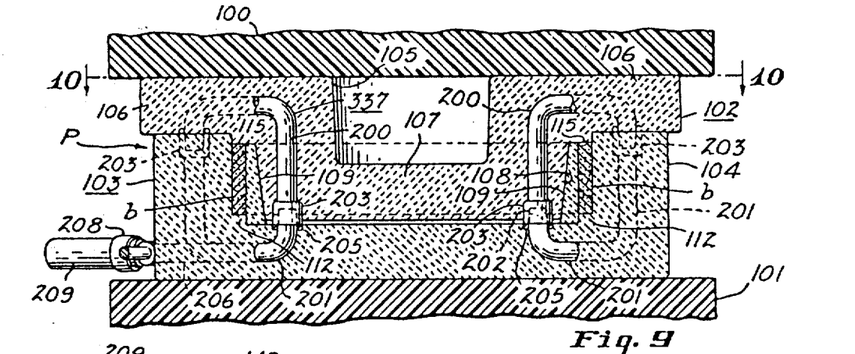
FIGURE 9 is a vertical sectional view taken on the line 9—9 of FIGURE 10 showing an apparatus for curing brake shoes or the like according to this invention.

The press P has upper and lower platens 100 and 101 which are moved toward and away from each other to apply the desired pressure to a mold placed between the platens. As herein shown, a non-metallic circular mold is provided having two main non-metallic mold sections 102 and 103 which fit together to provide a closed annular mold cavity of the desired shape. The lower mold section 103 is shaped like a flat bottomed cup and has a cylindrical marginal wall 104 of uniform height. The upper mold section 102 has a circular central recess 105 surrounded by a flat annular flange 106 which rests on the flat horizontal upper surface of the wall 104 as shown in FIGURE 9 which is drawn substantially to scale. It will be understood, however, that the size of the mold and the various parts may vary considerably and that the drawings are not limiting, but are merely for purposes of illustration.

Figures 10, 11, 12:
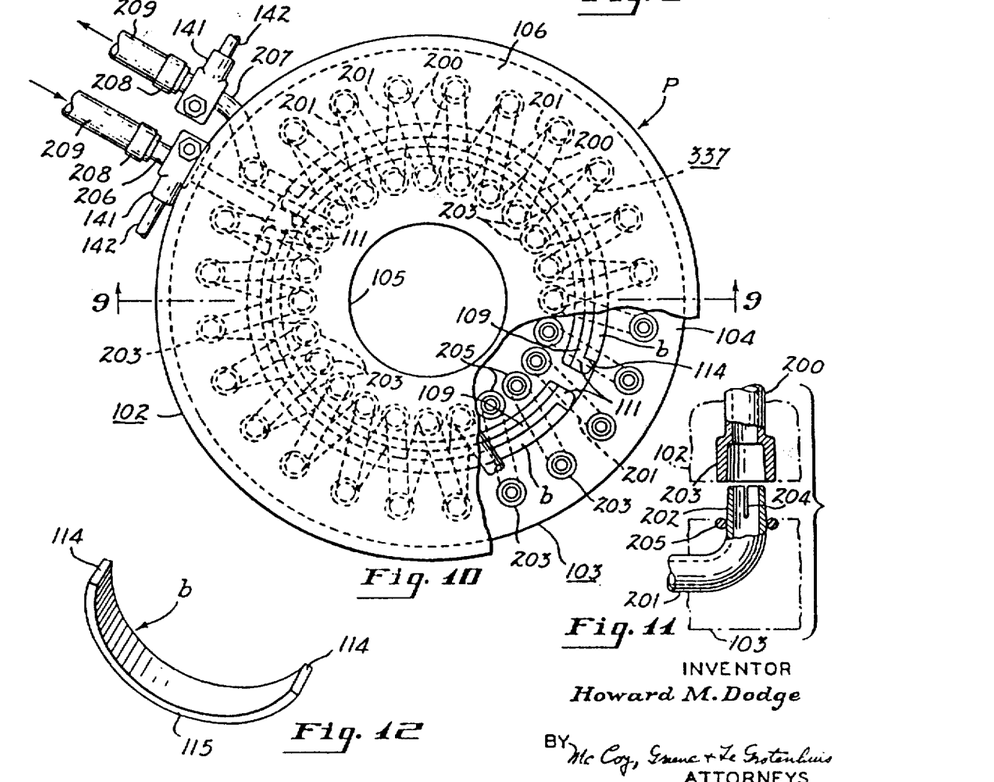
FIGURE 10 is a top plan view with parts broken away taken on the line 10—10 of FIGURE 9.
FIGURE 11 is a fragmentary side elevational view on a larger scale with parts broken away and shown in section.
FIGURE 12 is a perspective view of a brake shoe insert formed in the apparatus of FIGURES 9 and 10.

The lower central portion 107 of the mold section 102 fits within the annular wall 104 concentric thereto and has a tapered frustro-conical outer surface 108 which gradually increases in diameter from the bottom of the mold section 102. Two tapered externally cylindrical semi-circular sleeve blocks 109 having tapered internal surfaces of revolution of the same shape as the surface 108 fit the latter surface as shown in FIGURE 9 so that when the mold 102–103 is fully closed, there is defined two semi-circular mold cavities of rectangular vertical cross section suitable for forming two brake shoe inserts b as shown in FIGURE 12. Each block 109 has enlarged end portions 111 which close the space between the surface 108 and the internal cylindrical surface of the wall 104 to form the flat end surfaces 114 of the insert b. The lower mold section 103 has an annular shoulder 112 with a flat surface forming one of the flat sides faces 115 of each insert b and an internally cylindrical surface which engages the externally cylindrical surface at the bottom of each block 109. The shoulder 112 is not essential, but may be employed to assist in locating the two semi-circular blocks 109.

The mold cavity adjacent the blocks 109 is filled with a suitable thermosetting material containing magnetic iron oxide according to this invention, the mold is fully closed as shown in FIGURE 9 to shape the two brake shoe inserts b and such inserts are vulcanized by subjecting the thermosetting material to a high frequency magnetic field whereby the magnetic iron oxide particles are heated within a few seconds to vulcanizing temperature.

Any suitable coil may be located around each insert b to provide the needed high frequency magnetic field. As herein shown, an annular coil 337 having oval shaped convolutions closely spaced around the circumference is embedded in the two mold sections 102 and 103, the coil being split into upper and lower sections to permit opening of the mold as the platens of the press are separated. Each convolution of the coil 337 is formed by an upper L-shaped pipe 200 and a lower pipe 201 of the same size and shape located in an inverted position. Each of the pipes 200 and 201 has a male end portion 202 which projects a short distance beyond the parting line of the mold and an annular female end portion 203 which receives the portion 202 to provide a water-tight seal when the mold is closed. Each portion 202 may be provided with a narrow vertical groove 204, if desired, to permit slight deflection and a better fit, in which case it may be desirable to provide elastic O-ring seals 205 for engaging the flat end faces of the female portions 203.

The use of split coils for induction heating of metal parts is known in the art, and it will be apparent to those skilled in the art that many other types of joints may be provided to join the coils when the induction heating is to be affected.

It is often desirable to pass water or other fluid through the coil 337 to regulate the temperature and to facilitate cooling of the mold at the end of the curing operation, although the use of a cooling or heating fluid in the coil is not essential. As herein shown, the coil 337 has a water inlet pipe 206 and an outlet pipe 207 to permit circulating of water through the hollow pipes 200 and 201 forming the various convolutions of the coil. The arrangement of the pipes 200 and 201 is clearly shown in FIGURES 9 and 10, the opposite end portions 202 and 203 of each L-shaped pipe 200 being connected to the female portion 203 of one adjacent pipe 201 and the male portion 202 of the other adjacent pipe 201. Thus, the water flows through the inlet 206 and through all of the convolutions of the coil to the outlet 207. As herein shown, fittings 208 are provided to connect the ends of the pipes 206 and 207 to the flexible supply hoses 209. In order to create the necessary high frequency magnetic field, a high current is passed through the coil 337 through the electric lines 142 similar to the lines 42 described above. These lines may be connected to the copper pipes 206 and 207 by battery type clamps 141.

The surfaces 55, 155 and 255 of the respective fluid heating portions C, C' and C" are preferably permanently lubricated by having embedded therein Teflon or other particles that are non-adhering to the unusual products being produced. In the production of the surfaces, the metal is coated with porous chromium by forming a chromium plating on the metal base then applying a reverse direct current or an alternating current to produce a porous surface. The article is thereafter heated to a temperature such as 500° or 600° F. which is well above the temperature used for curing the thermosetting extrusion and, while the metal is at such elevated temperature, "Teflon" powder preferably of 5 to 30 micron size and cooled preferably by liquid nitrogen, is brushed into the hot surface pores. The process is described in application Ser. No. 474,130, of Clarence W. Forestek, filed July 22, 1965. Such a surface prevents the extended article from plugging the extrusion. A cord or wire may be incorporated throughout or in the interior of at least the lead portion of the extruded article to further facilitate the withdrawal of the article from the curing chamber by application of tension thereto. The rubber compound may be continuously extruded about such cord or wire by conventional means (not shown).

As aforesaid, an essential of the process of the present invention is the magnetic iron oxide material should, for st results, be finely divided; the finer the particle size d the more uniform the dispersion, the better is the ual result. An exception occurs in friction material for akes, clutches and the like. However, where some glomeration of the magnetite is found to be an advange, a major portion of the magnetite should preferably ass through a 100 mesh screen. Larger particles tend give inferior results.

The quantity of the magnetite may be varied widely, it at least 2% or 3% is usually required for efficient ating. Generally, 5 to 10 or 15% by weight, based on e weight of the rubber or thermosetting material, is eferably used and up to 20 or 25% by weight based the total compound is in some cases desirable. This especially true in those cases where substantial proortions of other fillers are present in the compound, as some rigid friction materials.

It is found that when the magnetite is coated or heated ith a coupling agent, such as a polyisocyanate, an unsatuted isocyanate, a hydroxy-reactive unsaturated- or mino- or hydroxy-alkylenyl-silicon compound, that perior bonds are obtained and the compound has supeior functional properties.

In the case where the thermosetting material in the ompound to be cured is a phenolic or epoxy or melamine esin, the magnetite powder may be treated with a couling compound to attach epoxyalkylsiloxane or aminolkylsiloxane groups, or isocyanate groups to the surface hereof. It is preferably treated with a hydroxy-reactive poxyalkylsilicon compound or with aminoalkylsilicon ompound, such for example as gamma-aminopropyltrimethoxysilane, or the reaction product of an alkylene olyamine, such as ethylene diamine, with a haloalkylrialkoxysilane having the halogen spaced by at least 3 arbons from the silicon atom. The compounds described n Patent No. 3,249,461 are also desirable. Polyisocyanates such as toluene diisocyanate naphthylene triisocyanate, methylene bisparaphenylene diisocyanate and the like, as described in Patent No. 3,156,576 are also desirable for treating the powders while slurried in an organic liquid that is substantially free of functional groups. This is particularly the case when the binder comprises a rubbery or more rigid solid polyurethane.

When the thermosetting material, the binder, has a rubber base or comprises an olefinically unsaturated polymerizable material, the powdered magnetite is preferably treated to bond unsaturated instead of or in addition to amino- or epoxyalkylsilicone oxide groups to the surface thereof. Such groups may be attached as described in any of Patents Nos. 3,249,461, 2,742,378, 2,841,566, 2,863,846, 2,878,111, 2,886,460, 2,951,782 and 2,965,515, etc. The treatment of the powders may be in aqueous liquid in the case of the alkoxy silicon compounds with subsequent heating to 250° F. after drying to cause reaction with the surface of the powder or the treatment may be had in a slurry in organic liquid in the case of the silicon halides or isocyanates. Subsequent heating to about 100° C. or more is desirable. The thus treated powder bonds to the thermosetting material.

The thermosetting rubber base compositions (rubber compounds) usually comprise essentially the rubber (natural or synthetic), the magnetite, filler, curing agent (sulfur or peroxide), accelerator and antioxidant as is wellknown in the art. A common novel feature in the compounds of the present invention is the presence of the aforesaid quantity of magnetite therein. Urethane polymers or polyurethane rubbers are especially desirable. The thermosetting friction compounds usually comprise a thermosetting binder, such as a rubber or thermosetting resin, and an epoxy, phenolic, urea-formaldehyde, melamine, polyurethane, a suitable curing agent or hardener such as hexamethylene, tetramine for phenolic and amine aldehyde resins, or a peroxide and tertiary amine catalyst in the case of polyurethanes and sulfur or other vulcanizing agent in the case of rubber, and asbestos fibers, etc. in addition to the magnetite.

Examples of compositions of the present invention and usable in the process and apparatus above described are as follows:

Example No. 1.—Friction material

| | Parts by weight |
|---|---|
| Elastomer (50 Mooney SBR rubber) | 10 |
| Methyl tuads (tetramethylthiuram disulfide) | 1 |
| Zinc oxide | 2 |
| Altax (benzothiazyl disulfide) | 0.25 |
| Stearic acid | 0.75 |
| Dicalite (diatomaceous silica) | 5 |
| Barytes (barium sulfate) | 10 |
| Brass chips | 8 |
| Graphite | 2 |
| Aluminum oxide | 4 |
| Asbestos fibers | 43 |
| Litharge | 6 |
| Magnetite ($FeOFe_2O_3$) powder | 10 |

The magnetite powder is treated by wetting it with a 2% by weight aqueous solution or dispersion of the acrylic ester of gamma-hydroxypropyl trimethoxy silane, and dried at 250° F. The above materials are then mixed in a Banbury-type mixer in conventional manner, the methyl tuads and Altax being added last as a masterbatch with a small amount of the rubber. The compound is sheeted out and portions incorporated into a curing mold, such as illustrated in FIGS. 9 and 10. It is cured with a current of around 50 amperes and a frequency of about 200,000 cycles per second in a few minutes. The current is reduced after the temperature reaches 375° F. to a value merely to maintain temperature until the desired cure is obtained.

In the above example, the 50 ML–4 SBR elastomer may be substituted by natural rubber or various synthetic rubbers, such as any of the SBR rubbers, nitrile rubbers, butyl rubber, rubbery propylene oxide-allyl glycidal ether copolymers, and rubbery ethylene-propylene-diolefine copolymers.

Example No. 2.—Friction material

| | Parts by weight |
|---|---|
| Novalac phenol-formaldehyde resin | 20 |
| Hexamethylene tetramine | 4 |
| Dicalite (as above) | 4.5 |
| Powdered coke | 7.25 |
| Barytes (as above) | 8.3 |
| Asbestos fibers | 54.4 |
| Magnetite powder | 9.25 |

The magnetite is pulverized so that it all passes through a 100-mesh screen. It is then treated by wetting it with an aqueous dispersion of gamma-amino propyl trimethoxysilane (Union Carbide & Carbon Corporation's A–1100) powder, drained from excess liquid, and drying at 250° F. The above materials are then mixed in an internal mixer and cured as in Example 1 at a frequency and field strength sufficient to obtain a temperature of 330° F. In the mixing process the ingredients may be added in any desired order to the resin.

Example No. 3.—Friction material

| | Parts by weight |
|---|---|
| Thermosetting phenolic resin with hardener (as above) | 23 |
| Barytes | 10 |
| Asbestos fibers | 60 |
| Graphite | 4 |
| Carbon black (Gastex) | 3 |
| Aluminum oxide | 2 |
| Magnetite powder | 10 |

The magnetite powder is preheated as in Example 2. The mixture is thereafter mixed and cured as in Example 2. In the above example approximately equivalent ...lts may be obtained with 5 to 12% of magnetite.

*Example No. 4.—Friction material*

In Example No. 3, the phenolic resin is substituted by parts of the same phenolic resin and 10 parts of NL–1, a copolymer of cashew nut oil and phenolic resin ...de by Minnesota Mining & Manufacturing Co. Other ...ditions are the same; similar results are obtained.

In Examples 1 to 4, the graphite, when present, serves a lubricant. Molybdenum disulfide and/or boron ni...le can also be used for part or all thereof. These ma...ials improve wear resistance and give a smoother ...rating article less subject to grabbing and binding.

*Example No. 5.—Extrudable rubber compounds*

| | Parts by weight |
|---|---|
| ...ld rubber (SBR 1500) | 75 |
| ...R 1018 (divinyl benzene crosslinked SBR) | 25 |
| ...mate (bismuth dimethyldithiocarbamate) | 2 |
| ...date (lead dimethyldithiocarbamate) | 1 |
| ...ax (as above) | 1 |
| ...fur | 0.75 |
| ...rbon black (Gastex) | 20 |
| ...eRite White (sym-dibeta-naphthyl-p-phenylene-diamine) | 1 |
| ...raffinic oil | 10 |
| ...ignetite | 10 |

The above materials are mixed according to usual com...unding practice and incorporated into an extruding ap...ratus as illustrated in FIGS. 1 and 2. The temperature ...the exit of the extruder is about 230° F. By applying ...fficient current at a frequency of 300,000 cycles/second, ... temperature is raised to about 340° F. at the exit of ... heater B. The temperature is maintained at about 340 ...350° F. by steam in the cavity 61 of the curing portion ...The speed of the extrusion is controlled to provide the ...sired state of cure.

*Example No. 6*

| | Parts by weight |
|---|---|
| ...evea rubber (smoked sheet) | 3.32 |
| ...ltax (as above) | 1.73 |
| ...PG (diphenylguanidine) | 0.68 |
| ...lfur | 2.02 |
| ...etarder W (powder containing salicylic acid) | 0.26 |
| ...nc oxide | 3.65 |
| ...geRite powder (phenyl-beta-naphthylamine) | 0.73 |
| ...inc laurate | 1.00 |
| ...astex (SRF black) | 13.95 |
| ...araffinic oil | 2.70 |
| ...unproof Regular (waxy anti-ozonant) | 1.46 |
| ...lagnetite | 7.00 |

The above ingredients are mixed and cured as in Ex...mple No. 5. When cured it has a Shore A hardness of ...bout 45 and a tensile strength of about 4,000 p.s.i.

*Example No. 7*

| | Parts by weight |
|---|---|
| ...latural rubber (pale crepe) | 32 |
| ...latural rubber (smoked sheet) | 37.10 |
| ...BR 1009 (divinyl benzene crosslinked SBR) | 5.05 |
| ...ethyl tuads (as above) | 1.37 |
| ...aptax (2-mercaptobenzothiazole) | 0.37 |
| ...ulfur | 0.55 |
| ...inc oxide | 4.45 |
| ...L.E. (reaction product of diphenyl amine acetone) | 0.37 |
| ...geRite powder | 0.37 |
| ...RF carbon black | 8.15 |
| ...elizone Special (protective wax) | 1.5 |
| ...araffinic oil | 9.35 |
| ...ltax (as above) | 0.37 |
| Magnetite powder (previously treated with 0.1% of vinyl triethoxymethoxy silane) | 9 |

The above composition, when mixed and cured as in Example 5, has a Shore hardness of about 30 and a tensile strength of 2,000 p.s.i.

*Example No. 8*

| | Parts by weight |
|---|---|
| Hevea (smoked sheet) | 64.62 |
| Methyl Zimate (zinc dimethyl dithiocarbamate) | 0.22 |
| Altax | 0.32 |
| Sulfur | 2.00 |
| Retarder W (as above) | 0.26 |
| Zinc oxide | 3.88 |
| B.L.E. (antioxidant as above) | 0.65 |
| Sodium acetate | 0.26 |
| EPC carbon black | 27.34 |
| Crude lauric acid | 0.45 |
| Magnetite powder | 6.00 |

The magnetite powder, passing a 100-mesh screen, is previously treated with a coupling agent such as unsaturated hydroxyl-reactive organosilicon compound, specifically the vinyl triethoxymethoxy silane. The treatment was had by wetting the magnetite powder with a solution of 1% of the silane, draining the excess, and drying at about 250° F. to bond the residue of the coupling agent (the silane) to the surface of the powder. The dry ingredients are then mixed, extruded, heated by the alternating magnetic field to curing temperature, and cured as in the prior example.

The above composition has a Shore A hardness of 60 and a tensile strength of 4000 p.s.i.

*Example No. 9*

| | Parts by weight |
|---|---|
| Neoprene GN–A (polymer of 2-chloro-butadiene-1,3 containing a discoloring antioxidant) | 48.30 |
| Dicumyl peroxide | 1 |
| Maglite M (magnesium oxide) | 2 |
| Zinc oxide | 5 |
| Neozone A (N-phenyl-alphanaphthylamine) | 0.5 |
| Gastex (SRF black) | 28.20 |
| Stearex flakes | 0.30 |
| Circolight Rubber Process Oil (naphthenic type) | 3.5 |
| T-BEP (tributoxyethyl phosphate) | 2.80 |
| Magnetite powder (as above) | 8.90 |

The above composition is mixed and cured as in Example 5 and when cured has a Shore A hardness of around 60 and a tensile strength of around 2000 p.s.i.

*Example No. 10.—Neoprene sponge*

| | Parts by weight |
|---|---|
| Neoprene GN–A (as above) | 41.17 |
| SBR 1009 (divinyl benzene crosslinked butadiene-styrene rubber) | 6.38 |
| Magnesium oxide | 1.70 |
| Zinc oxide | 2.13 |
| Thermax (medium thermal carbon black) | 22.55 |
| Stearex flakes (as above) | 0.43 |
| Cottonseed oil | 3.40 |
| Paraffin wax | 0.85 |
| Picco 100 (paracoumarone-indene resin) | 2.13 |
| Brown factice | 4.26 |
| Dicumyl peroxide | 1.00 |
| Celogen OT (p,p'-oxybis-(benzene sulfonyl hydrazide)) | 3.00 |
| Magnetite powder (treated to attach vinyl siloxane groups as above) | 11.00 |

The above ingredients are mixed as in Example 5 and extruded through a porous, nonmetallic die of a magnetic heating element, such as is illustrated in FIG. 5 of the drawings. The surface of said heater is lubricated by forcing a controlled small amount of silicone oil lubricant through said die. The mixing and curing are as described in Example 5.

Example No. 11.—SBR tread stock

| | Parts by Weight | |
|---|---|---|
| | A | B |
| 50 Mooney SBR cold rubber (nonstaining antioxidant) | 61.65 | 61.65 |
| Santocure (N-cyclohexyl-2-benzothiazole sulfenamide) | 0.80 | |
| Sulfur | 1.40 | (?) |
| Zinc oxide | 1.80 | 1.80 |
| Stabilite (N,N'-diphenylenediamine) | 0.60 | |
| EPC carbon black | 58.35 | |
| Para-Flux (saturated polymerized petroleum hydrocarbons) | 5.5 | 5.5 |
| Dismate (as above) | | 0.87 |
| Ledate (as above) | | 0.87 |
| Altax (as above) | | 0.50 |
| Magnetite (treated as above with vinyl-triethoxy-methoxy silane) | 10.0 | 10.0 |

Each of compositions "A" and "B" of this example were cured 2 to 4 seconds at about 400° F. The mixed material is extruded using equipment of the type shown in the drawings, the material entering the die at a temperature of 280° to 300° F. There is a temperature rise of 100 to 120° F. in the induction field, whereby the material is cured at about 400° F.

Example No. 12.—Hycar stock

Parts by weight
| | |
|---|---|
| Hycar–OR15 (emulsion copolymer of about 40% acrylonitrile and about 60% butadiene) | 58.30 |
| Altax | 0.80 |
| Sulfur | 1.40 |
| Zinc oxide | 2.80 |
| Neozone D (N-phenyl-betanaphthylamine) | 0.60 |
| Gastex (SRF black) | 23.0 |
| Plasticizer SC (triglycol ester of vegetable oil fatty acid) | 3.70 |
| T-BEP | 3.60 |
| Methyl tuads | 2 |
| Magnetite powder (pretreated to attach vinyl siloxane groups to surface portions) | 10 |

The above composition when mixed and cured as in Example 5 has a Shore A hardness of 60 and a tensile strength of 2500 p.s.i.

Example 13.—Butyl stock

Parts by weight
| | |
|---|---|
| Butyl rubber | 100 |
| Hycar 2202 (acrylonitrile-butadiene rubber) | 2 |
| HAF carbon black | 30 |
| HMF carbon black | 30 |
| Petrolatum | 2 |
| Stearic acid | 1 |
| Amberol ST 137 (condensation product of paratertiary butyl phenol and formaldehyde) | 12 |
| Magnetite powder | 10 |

The ingredient sare mixed, extruded, heated and cured as in Example 5 to produce a cured extrusion having desirable properties.

Example 14.—Silicone type

Parts by weight
| | |
|---|---|
| GE silicone rubber—SE–421 | 100 |
| Shawinigan acetylene black (a high structure conductive black) | 99 |
| Di-cup 40C (40% dicumyl peroxide supported on EPT calcium carbonate) | 2.5 |
| Magnetite powder | 10 |

The above material is mixed on a mill until generally uniform and cured by the induction extruder method of the type described above for 2 to 4 seconds at 425° to 450° F.

Figure 8:
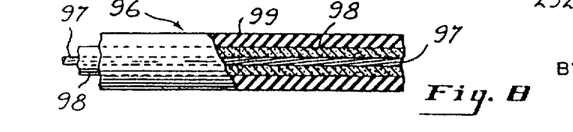
FIGURE 8 is a fragmentary side elevational view of an automobile ignition cable made according to this invention with parts shown in section.

The above material is especially desirable for use in automotive ignition cables 96 (FIG. 8) having a central glass cord 97 surrounded by the above conducting material 98 and further surrounded by an outer sleeve 99 of insulation material, such as chlorosulfonated polyethylene, such as Hypalon 20 or Hypalon 40. The insulation material is preferably an ethylene-propylene rubber (not shown).

In the various examples above, it will be apparent that a wide variety of different antioxidants, accelerators, oils and other ingredients may be employed. The paraffinic oils may, for example, be Prorex 36, made by Mobil Oil Corporation, or 511 Rubber Process Oil, made by Sun Oil Company.

It will be seen from the above that the present invention has primary applicability to:

(a) The field of friction materials where the magnetic iron oxide functions both as a heat-producing agent during the manufacture to produce more uniform heating and more uniform curing in conjunction with a rapidly changing magnetic field; (b) In the production of extruded gasket material such as extruded sponge rubber where production, including the curing step, is continuous; and (c) In the production of extremely thick articles, such as truck and off-the-road vehicle tire treads where heat penetration from outside sources to the interior is exceptionally slow.

It is also apparent that in accordance with the provisions of the patent statutes modifications of the invention may be made without changing the spirit thereof.

I claim:

1. A process of making an article which is shaped by extrusion and is obtained in a cured state in a substantially continuous manner, which comprises substantially uniformly incorporating into a curable sponge compound comprising a blowing agent and an organic polymeric binder, which is suitably compounded to cure at elevated temperatures, at least 2 percent of the weight thereof of a finely divided magnetic iron oxide to form a mixture, extruding said mixture into an induction heating zone of desired cross sectional shape, comprising nonmagnetic walls wherein said mixture is subjected to a high frequency magnetic field to heat it to a vulcanizing temperature, maintaining the mixture in the desired cross sectional shaped form while moving it with respect to said zone and with respect to the confining walls of said zone, and passing the mixture continuously from said induction heating zone into lubricated contact with fluid heated walls of a curing chamber having a cross section of the desired shape, and thereafter maintaining said mixture at a vulcanizing temperature by contact with said heated walls of said curing chamber for a sufficient time to cause curing of said polymeric binder.

2. The process of claim 1 wherein the walls of said curing chamber are heated to a curing temperature by steam.

3. The process of claim 1 wherein said mixture is allowed to expand in cross section, said expansion being allowed to occur to a point no more than just below a point where the cell rupture occurs.

4. The process according to claim 3 wherein the surface layer of the curing chamber is composed of porous chromium having finely divided powder of polyfluorinated polymer held in surface pores thereof.

5. The process according to claim 1 wherein said sponge while moving through said curing zone is held in shaped form by contact with heated walls thereof and wherein surface lubrication between said walls and said sponge is provided by a surface layer, which comprises porous chromium having finely divided polyfluorinated polymer powder held in surface pores thereof.

6. The process according to claim 1 wherein said magnetic iron oxide comprises 5 to 15 percent by weight of said high polymeric material.

7. The process according to claim 6 wherein surface portions of said magnetic iron oxide are treated by contact with a coupling agent having a portion of the molecule thereof for reaction with said polymeric binder and another portion thereof for reaction with groups carried on the surface of said iron oxide.

8. The process according to claim 7 wherein said iron oxide contains unsaturated organosilyl groups attached to surface portions thereof.

References Cited

UNITED STATES PATENTS

| | | | |
|---|---|---|---|
| 2,414,391 | 1/1947 | Peaker | 264—236 |
| 2,449,390 | 9/1948 | Kirby | 264—236 |
| 2,579,815 | 12/1951 | Gialanella | 25 |
| 2,688,768 | 9/1954 | Rayburn | 25 |
| 2,709,161 | 5/1955 | Kilbourne | 264—236 |
| 2,742,669 | 4/1956 | Rhodes | 264—236 |
| 2,838,472 | 6/1958 | Lucas | 264—236 |
| 2,849,312 | 8/1958 | Peterman | 264 |
| 3,013,307 | 12/1961 | Rhoads | 264—236 |
| 3,054,142 | 9/1962 | Hindered | 25 |
| 3,249,658 | 5/1966 | Hodges | 264—25 |

OTHER REFERENCES

Rubber Age: Vulcanization or Other Heat Treatment by Electrical Conduction, November 1942, 264–27, p. 133.

ROBERT F. WHITE, *Primary Examiner.*